Dec. 25, 1934.    T. D. McCALL    1,985,323
CITRUS FRUIT JUICE MACHINE
Filed June 12, 1931    3 Sheets-Sheet 2

INVENTOR
Thaddeus D. M<sup>c</sup>Call.
BY Townsend, Loftus + Abbett
ATTORNEYS.

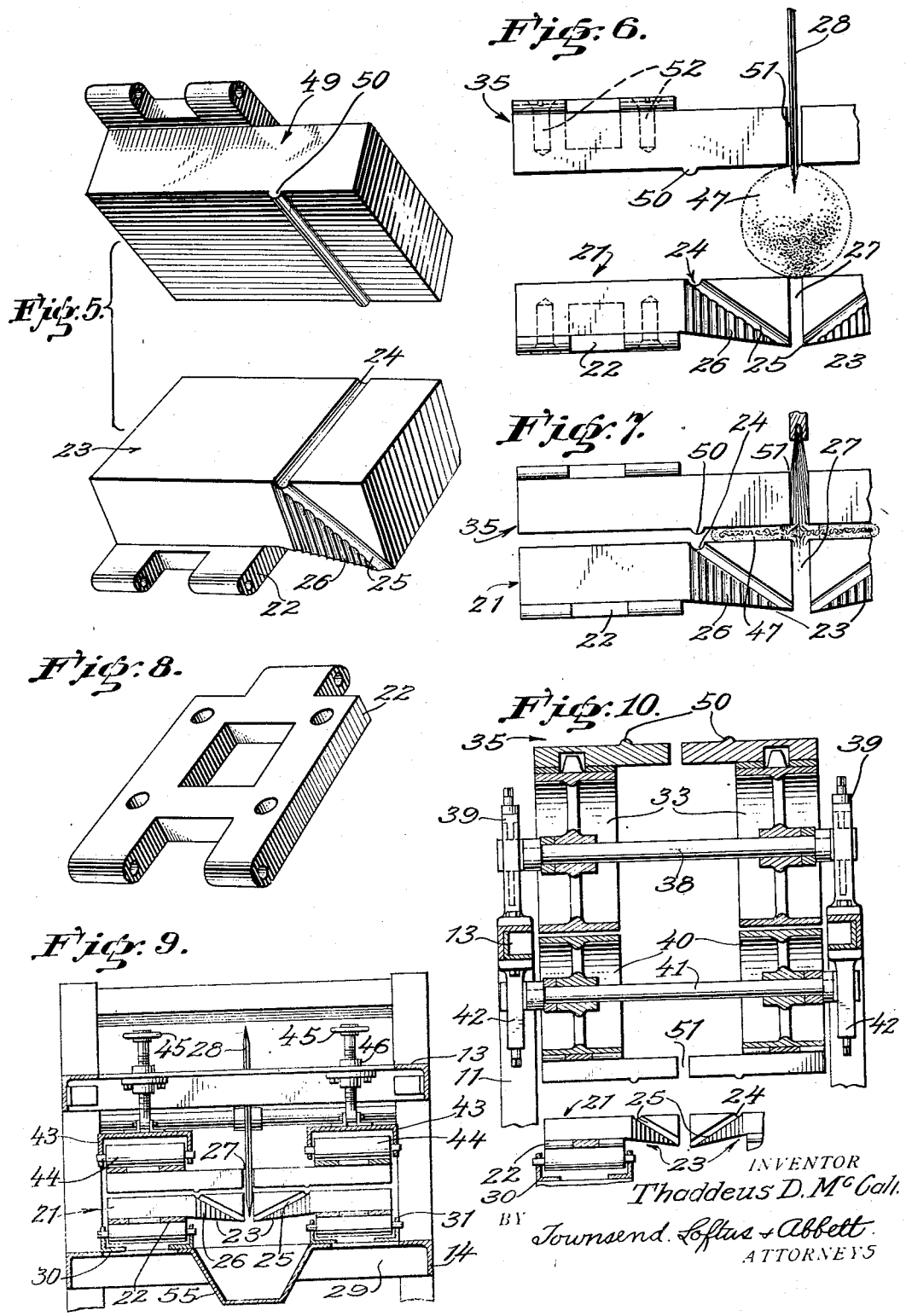
Dec. 25, 1934. T. D. McCALL 1,985,323
CITRUS FRUIT JUICE MACHINE
Filed June 12, 1931 3 Sheets-Sheet 3

Patented Dec. 25, 1934

1,985,323

UNITED STATES PATENT OFFICE 1,985,323

CITRUS FRUIT JUICE MACHINE

Thaddeus Dale McCall, Imperial, Calif.

Application June 12, 1931, Serial No. 543,757

3 Claims. (Cl. 100—35)

This invention relates to a machine by which juice may be rapidly and thoroughly extracted from citrus fruit and the like. It is the principal object of the present invention to provide a machine into which fruit, such as citrus fruit, may be fed consecutively and by which the fruit will be automatically split and squeezed and the pulp removed and cleaned from the fruit rind.

The present invention contemplates the provision of a machine having a pair of endless conveyors operating in the same plane which conveyors carry squeezing elements adapted to cooperate on the contiguous run of the adjacent conveyors to form a throat into which the fruit may be fed and along which the fruit may be carried as it is split and thereafter progressively squeezed, the structure also embodying means for removing desirable fruit pulp from the severed edges of the split and squeezed rind.

The invention is illustrated by way of example in the accompanying drawings in which:

Fig. 5 is a composite view in perspective showing complementary squeezing blocks in a partially opened and inclined position as they would occur near the point of entry of the fruit.

Fig. 6 is an enlarged view in end elevation showing the manner in which the blocks hold the fruit and further indicating the fruit as being partially split.

Fig. 7 is a view in end elevation showing the squeezing blocks in their closed position with severed halves of citrus fruit crushed between them, and further indicating the brush by which pulp is removed from the severed edges of the rind.

Fig. 8 is a view in perspective showing one of the links of the endless conveyor.

Fig. 9 is a view similar to Fig. 3 showing the squeezing blocks in their closed positions.

Fig. 10 is a view in transverse section through the machine showing the squeezing blocks partially separated as seen on the line 10—10 of Fig. 1.

Figure 1:
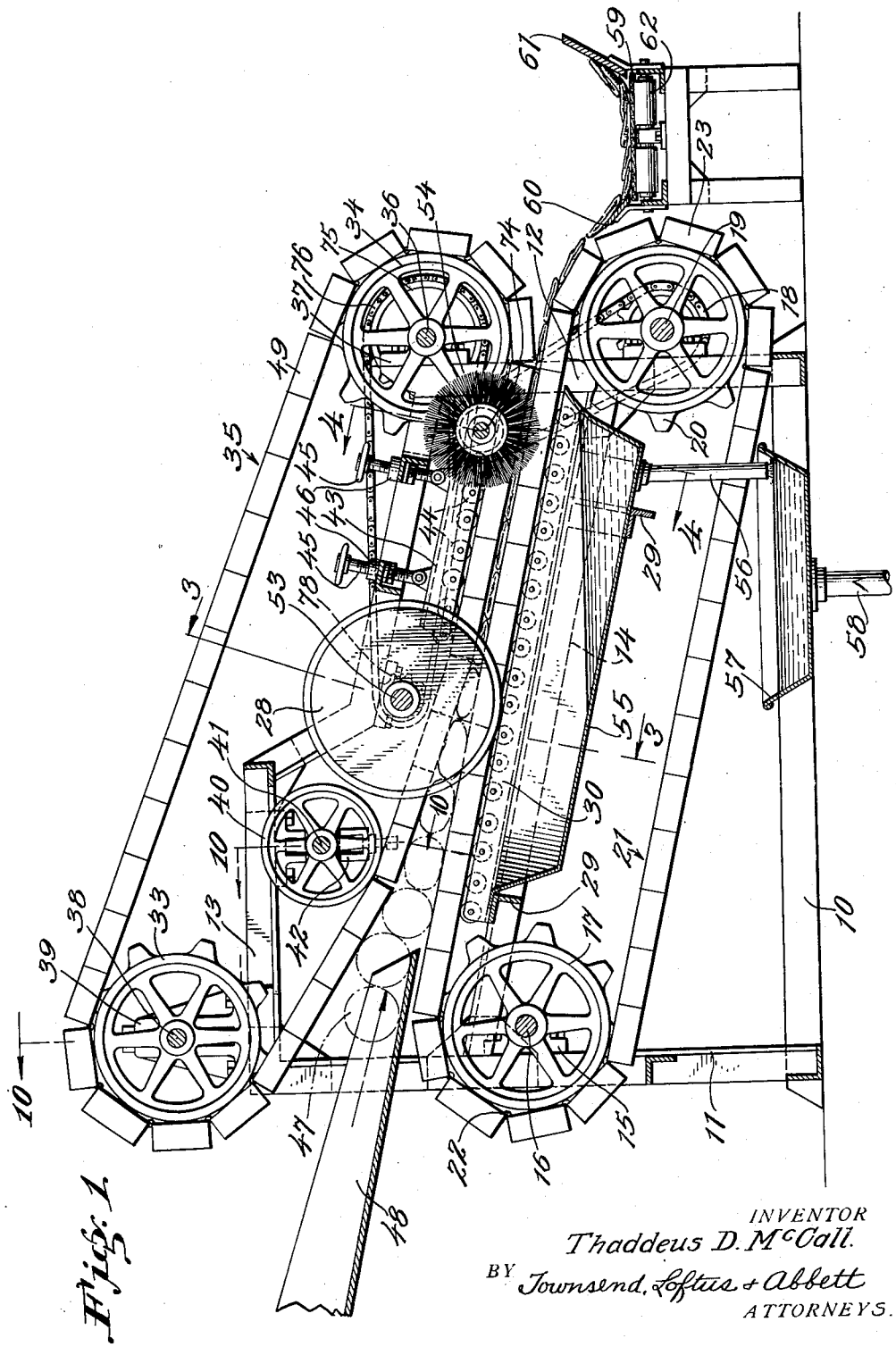
Figure 1 is a view in side elevation showing the complete machine and indicating the juice receptacles in section.

Referring more particularly to the drawings, 10 indicates a base upon which uprights 11 and 12 are disposed. These uprights are tied together at their upper ends by a frame structure 13 adapted to support the bearings for the various shafts of the mechanism. An inclined frame member 14 ties the uprights together at a point intermediate their ends. The pair of uprights 11 carry journal boxes 15 to receive a conveyor shaft 16 which shaft supports a pair of sprockets 17. Suitable journal boxes 18 are mounted upon the uprights 12 and support a shaft 19 carrying conveyor sprockets 20. The position of the shaft 19 is on a lower horizontal plane than the position of the shaft 16. Disposed around the sets of sprockets 17 and 20 is a lower conveyor belt 21 which is composed of a plurality of links 22 more particularly shown in Fig. 8. These links are articulately connected and are provided to receive lower squeezing blocks 23, one of which blocks is mounted on each of the links. By particular reference to Fig. 5 of the drawings it will be seen that these blocks are substantially rectangular in shape and that they overhang the side of the links 22. A transverse groove 24 is formed across the upper face of each of the lower blocks 23 at a distance from its overhanging end and for purposes which will be hereinafter described.

A diagonal groove 25 extends downwardly from the transverse groove 24 and is formed in the side faces of the block. This groove tends to direct juice downwardly and inwardly across the block and toward the center of a receptacle provided to receive it. The side faces of the block occurring in the overhanging end portion and beneath the diagonal groove are vertically corrugated, as indicated at 26, to further facilitate in the flow of juice and to prevent it from accumulating on the face of the block by capillary attraction. As will be seen in Figs. 3, 4, 9 and 10, the lower conveyor chains 21 are arranged in pairs spaced from each other and overhanging portions of the blocks 22 carried by each chain overhanging along adjacent edges to substantially bridge the space between the chains, save for a relatively narrow throat 27 into and through which a splitting knife 28 may extend and operate. Due to the fact that the shafts 16 and 19 are disposed in horizontal planes at different levels the upper run of the conveyor chain 21 is on an incline, this incline being at substantially the same angle as the angle of disposition of the inclined braces 14. The inclined braces carry transverse frame members 29 which support angle bars 30 and 31 providing trunnion bearings for a set of rollers 32. These rollers are disposed directly beneath the upper run of the conveyor chain 21 and prevent it from sagging under pressure of the squeezing action of the machine. Disposed above the pair of conveyor chains 21 and in their respective vertical planes are sets of sprockets 33 and 34 upon which are mounted upper conveyor chains 35. The sprockets 34 are mounted upon a horizontal shaft 36 carried by journal boxes 37 secured to the uprights 12. The relative distance between the shaft 36 and the shaft 19 is such as to insure that the conveyor chains and their squeezing blocks will be substantially together as they approach and pass a vertical plane intersecting the longitudinal axes of both shafts.

Figure 2:
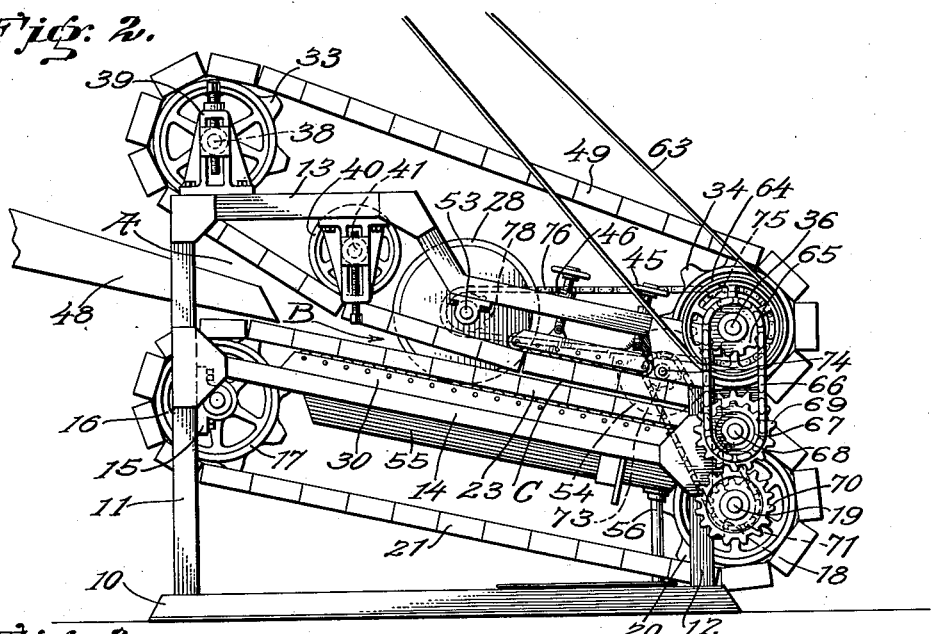
Fig. 2 is a view in side elevation showing the assembled machine, the view being on a reduced scale from that of Fig. 1, and particularly indicating the drive mechanism.
Figure 3:
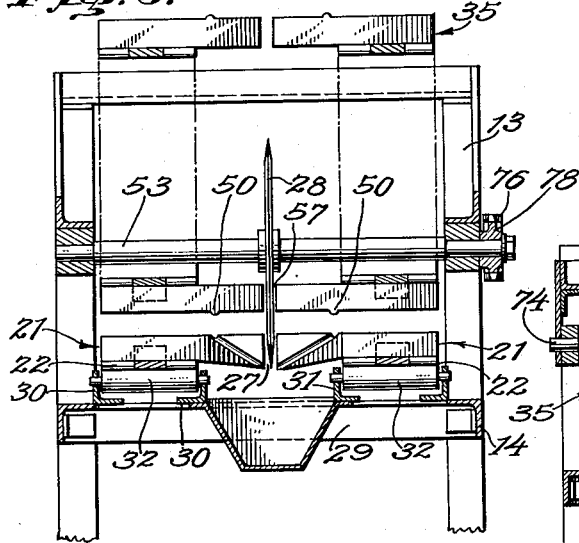
Fig. 3 is a view in transverse section through the machine as seen on the line 3—3 of Fig. 1.
Figure 4:
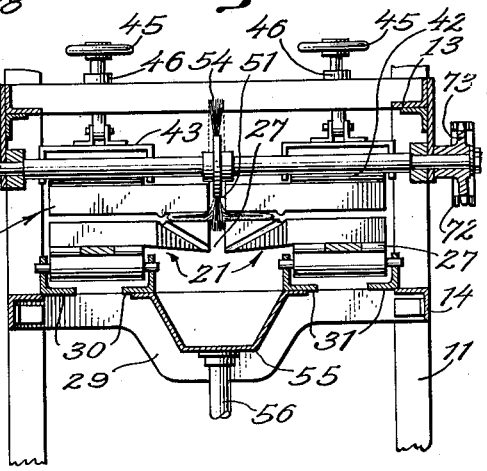
Fig. 4 is a view in transverse section through the machine as seen on the line 4—4 of Fig. 1 and particularly showing the pulp removing mechanism.

The sprockets 33 are mounted upon a shaft 38 carried upon adjustable bearings 39. The adjustable bearings are supported upon the transverse frame member 13. The shaft 38 is spaced a considerable distance above the shaft 16 although lying in substantially the same vertical plane and parallel thereto. The length of the conveyor chain 35 is such as to permit considerable slack in the lower run of the upper conveyor chain 35 so that the chain may be passed around means causing it to pursue a different path than a straight lineal one. As shown in Figs. 1 and 2 of the drawings this is accomplished by leading the lower run of chain around guide pulleys 40 mounted upon a shaft 41 and carried by adjustable bearings 42. The bearings are mounted upon the transverse frame member 13. Disposed a distance down the length of travel of the conveyor chains and adjacent the sprocket 34 is a straight frame member 43 carrying a plurality of rollers 44. These rollers are mounted upon adjusting screws 45 extending through threaded bearings 46. The frame member 43 may thus be adjusted from either end to provide a guide for the section of conveyor chain coming in contact with it and to prevent the squeezing blocks from yielding during the time an article of fruit is being squeezed between them. Due to the arrangement of the guide pulleys 40 and the guide rollers 44 the lower run of the upper conveyor chain cooperates with the upper run of the lower conveyor chain to form progressively narrowing throats into which citrus fruit 47 may be fed from a chute 48. This provides a relatively wide tapering throat indicated at A in Fig. 2 and a gradually closing V-shaped throat indicated at B in Fig. 2 of the drawings, which terminates in a relatively narrow passageway C extending between substantially parallel portions of the upper and lower runs of conveyor chains 21 and 35. The upper conveyor chain 35 which is formed of links 22 articulately connected carries a plurality of squeezing blocks 49 which are complementary to the blocks 23 as indicated in Fig. 5 and overhang the chain links 22 on the same side as do the blocks 23. The blocks 49 are rectangular in shape, having a flat end, thus interrupted by a rib 50 which is complementary to the transverse groove 24 in the blocks 23 and cooperates with this groove to prevent the juice from the split citrus fruit from squirting out between the blocks when the fruit is compressed. The blocks 49 have substantially the same overhanging length as the blocks 23, particularly shown in Figs. 4, 9, and 10 of the drawings, and provide an upper throat 51 through which the splitting knife 28 may pass. The blocks are secured to the links 22 by screws 52 which make it possible for them to be readily removed or interchanged.

Mounted in the path of the citrus fruit during the time it is conveyed along and between the throat B is the splitting disc 28. This disc is of relatively large diameter to facilitate in the cutting operation and is carried upon a shaft 53 supported in bearings on the transverse frame member 13. The disc extends downwardly through the throat 51 between the upper squeezing blocks 49 and the throat 27 between the lower squeezing blocks 23. As the fruit is compressed it is split by the disc and is drawn downwardly into the throat B to the point where the contracted passageway C occurs. Disposed in the path of travel of the fruit and at a point along the passageway C is a rotary brush 54 formed with bristles which project downwardly and strike the fruit along the line of severance to brush pulp from the split portion of the rind.

Disposed beneath the upper run of the lower chain 21 is a pan 55 into which juice may drain as the fruit is squeezed. This pan is inclined and at its lower end is provided with a drain pipe 56 which communicates with a pan 57. The juice may be drawn to any desired bottle or canning equipment through a pipe 58. Adjacent the sprockets 20 of the lower conveyor chain 21 is a transversely extending conveyor belt 59 mounted in the bottom of a trough having sideboards 60 and 61. Rollers 62 support the belt so that the belt may carry the rinds away after the juice has been extracted from them.

The entire structure is driven through a source of power supply not shown in the drawings but here indicated as actuating a belt 63. This belt passes around a pulley 64 on the shaft 36. A sprocket wheel 65 is secured to the outer end of the shaft 36. A sprocket chain 66 passes around the sprocket 65 and also around a sprocket 67 mounted upon a jack shaft 68. This shaft is provided with a reverse gear 69 in mesh with a gear 70 carried on the shaft 19, thus making it possible for the lower run of the upper chain 35 and the upper run of the lower chain 21 to travel at the same lineal speed and in the same direction. A sprocket wheel 71 is mounted upon the shaft 19 and is fitted with a chain 72 which is led around a sprocket wheel 73 mounted upon the spindle 74 of the brush 54. A sprocket wheel 75 is mounted upon the shaft 36 and drives a chain 76 which is led around a sprocket 78 on the shaft 53 of the splitting disc 28.

In operation of the present invention fruit is fed in consecutively along the trough 48 and wedges itself between complementary squeezing blocks 23 and 49. The fruit will be frictionally engaged and will advance with the blocks as they move together in throats A and B. When the fruit has been partially compressed in the throat B so that it will be firmly held it encounters the splitting disc 28 where it is completely severed into halves. As the severed fruit continues to travel along the progressively restricted throat B the juice will be squeezed from it. This will flow into the pan 55. The final squeezing operation takes place along the narrow throat C and while the squeezing blocks 23 and 49 are held against yielding by the sets of rollers 32 and 44. This will cause the compressed halves of the rind to be held in their compressed condition for some distance along their travel so that the juice will be completely expelled from them, after which the rind encounters the brush 54 where desirable particles of pulp are removed from the rind and brushed into the tank 55.

During the squeezing operation the construction of the blocks will tend to cause the juice to be drained away from the fruit and will also prevent it from being lost by reason of the presence of the groove 24 and the rib 50 on complementary blocks, and the corrugations 26 on the sides of the lower blocks. It is to be understood that the width of the squeezing blocks is proportionate to the general size of fruit to be squeezed and that this will insure that as the fruit rolls into the throat A from the trough each pair of blocks will receive and accommodate a single article of fruit.

Attention is directed to the fact that the construction here shown makes it possible to rapidly extract the juice from fruit, and in addition provides a machine which may be readily cleaned and maintained in a satisfactory sanitary manner, since the fruit juice is not liable to get upon the working parts of the machine other than the squeezing blocks.

While I have shown the preferred form of my invention as now known to me, it will be understood that various changes might be made in the combination, construction and arrangement of parts without departing from the spirit of the invention as claimed.

Having thus described my invention, what I claim and desire to secure by Letters Patent, is:

1. A device of the character described comprising two pairs of endless conveyors disposed with the pairs of conveyors in parallel vertical planes and moving in unison, the contiguous runs of the pair of conveyors in each vertical plane being disposed in angular vertical relation to each other to form a throat into which articles of fruit may be fed, separate conveyor blocks carried by the endless conveyors, said blocks of the complementary conveyors of each pair being in common horizontal planes, the blocks of the conveyors in common planes overhanging contiguous edges of the conveyors and projecting toward each other to form complementary jaws between portions of the runs of the vertically aligned conveyors forming the angular throat and into which articles of fruit may be compressed and whereby the juice from the fruit will fall between the conveyors and be carried away and the compressed rind carried from the machine, and a rotary brush driven by the machine and extending downwardly between the contiguous vertical faces of the blocks and to engage the line of severence of the compressed rind whereby the pulp will be brushed from the rind.

2. A device of the character described comprising two pairs of endless conveyors disposed with the pairs of conveyors in parallel vertical planes and moving in unison, the contiguous runs of the pair of conveyors in each vertical plane being disposed in angular vertical relation to each other to form a throat into which articles of fruit may be fed, separate conveyor blocks carried by the endless conveyors, said blocks of the complementary conveyors of each pair being in common horizontal planes, the blocks of the conveyors in common planes overhanging contiguous edges of the conveyors and projecting toward each other to form complementary jaws between portions of the runs of the vertically aligned conveyors forming the angular throat and into which articles of fruit may be compressed and whereby the juice from the fruit will fall between the conveyors and be carried away and the compressed rind carried from the machine, and a rotary brush driven by the machine and extending downwardly between the contiguous vertical faces of the blocks to engage the line of severance of the compressed rind whereby the pulp will be brushed from the rind, said brush rotating in a counter-direction of travel to the direction of movement of the rinds.

3. A device of the character described comprising a frame structure, a pair of horizontal shafts at each end thereof, the shafts of each pair being parallel and vertically spaced with relation to each other, a pair of sprocket wheels mounted on each of said shafts, said sprocket wheels being horizontally spaced from each other adjacent the ends of their respective shafts, the sprocket wheel at the corresponding end of each shaft being in the same vertical plane with each other, endless conveyors, one pair passing around the aligned sprockets of the two lower shafts and one pair passing around the aligned sprockets of the two upper shafts whereby one upper and one lower endless conveyor will lie in a common vertical plane in superposed relation to each other and another upper and lower endless conveyor will lie in another common vertical plane parallel to the first, the contiguous runs of the upper and lower endless conveyors of each pair being at an angle to each other to form a vertical throat into which articles of fruit may be fed, a series of separate blocks mounted on the outer faces of said conveyors to engage the fruit, the blocks on the conveyor in one parallel plane projecting toward the blocks of the conveyor in the other parallel plane and overhanging the adjacent edges of the conveyor, and means for simultaneously driving the upper conveyor in each parallel plane and the bottom conveyor in each parallel plane in opposite directions, and with their contiguous runs moving at a uniform rate of speed.

THADDEUS DALE McCALL.